United States Patent [19]
Nishiwaki

[11] Patent Number: 5,945,977
[45] Date of Patent: Aug. 31, 1999

[54] LUMINANCE SIGNAL PRODUCING CIRCUITS

[75] Inventor: Kazuhiko Nishiwaki, Kanagawa, Japan

[73] Assignee: Sony Corporation, Tokyo, Japan

[21] Appl. No.: 08/709,823

[22] Filed: Sep. 10, 1996

[30] Foreign Application Priority Data

Sep. 11, 1995 [JP] Japan ................................. 7-232163

[51] Int. Cl.$^6$ ................................................. G09G 5/10
[52] U.S. Cl. ......................... 345/147; 348/235; 348/280
[58] Field of Search ........................... 345/147; 348/234, 348/235, 236, 237, 242, 618, 666, 712

[56] References Cited

U.S. PATENT DOCUMENTS

| | | | |
|---|---|---|---|
| 4,249,203 | 2/1981 | Yamanaka | 348/264 |
| 4,751,567 | 6/1988 | Hashimoto | 348/224 |
| 4,752,821 | 6/1988 | Poetsch | 348/234 |
| 4,887,252 | 12/1989 | Miyakawa et al. | 348/242 |
| 5,267,028 | 11/1993 | Suga et al. | 348/223 |
| 5,283,634 | 2/1994 | Yamazaki et al. | 348/234 |
| 5,548,330 | 8/1996 | Hieda et al. | 348/234 |
| 5,671,013 | 9/1997 | Nakao | 348/234 |

FOREIGN PATENT DOCUMENTS 0 508 607   10/1992   European Pat. Off. .

*Primary Examiner*—Amare Mengistu
*Assistant Examiner*—Ricardo Osorio

*Attorney, Agent, or Firm*—Frommer Lawrence & Haug, LLP.; William S. Frommer

[57] ABSTRACT

A luminance signal producing circuit comprises a signal input portion to which an image pickup signal is supplied from a solid-state image sensor provided with a color filter array comprising a plurality of color filter units arrayed in the manner of a checkered green-line sequential red and blue arrangement, a wide band luminance signal generator, a low frequency compensation luminance signal generator and a signal synthesizer for synthesizing a wide band luminance signal and a low frequency compensation luminance signal obtained based on the image pickup signal respectively from the wide band luminance signal generator and the low frequency compensation luminance signal generator with each other to produce a luminance signal. The low frequency compensation luminance signal generator is operative to produce a first signal in which a vertical carrier signal component is cancelled and a second signal in which a horizontal carrier signal component is cancelled, then operative to extract one of the first and second signals having a smaller absolute value when the first and second signals have the same polarity and none of the first and second signals or a signal corresponding to an average to the first and second signals when the first and second signals have respective polarities different from each other so as to have an extracted signal, and further operative to supply a horizontal low pass filter with the extracted signal to obtain the low frequency compensation luminance signal from the horizontal low pass filter.

5 Claims, 5 Drawing Sheets

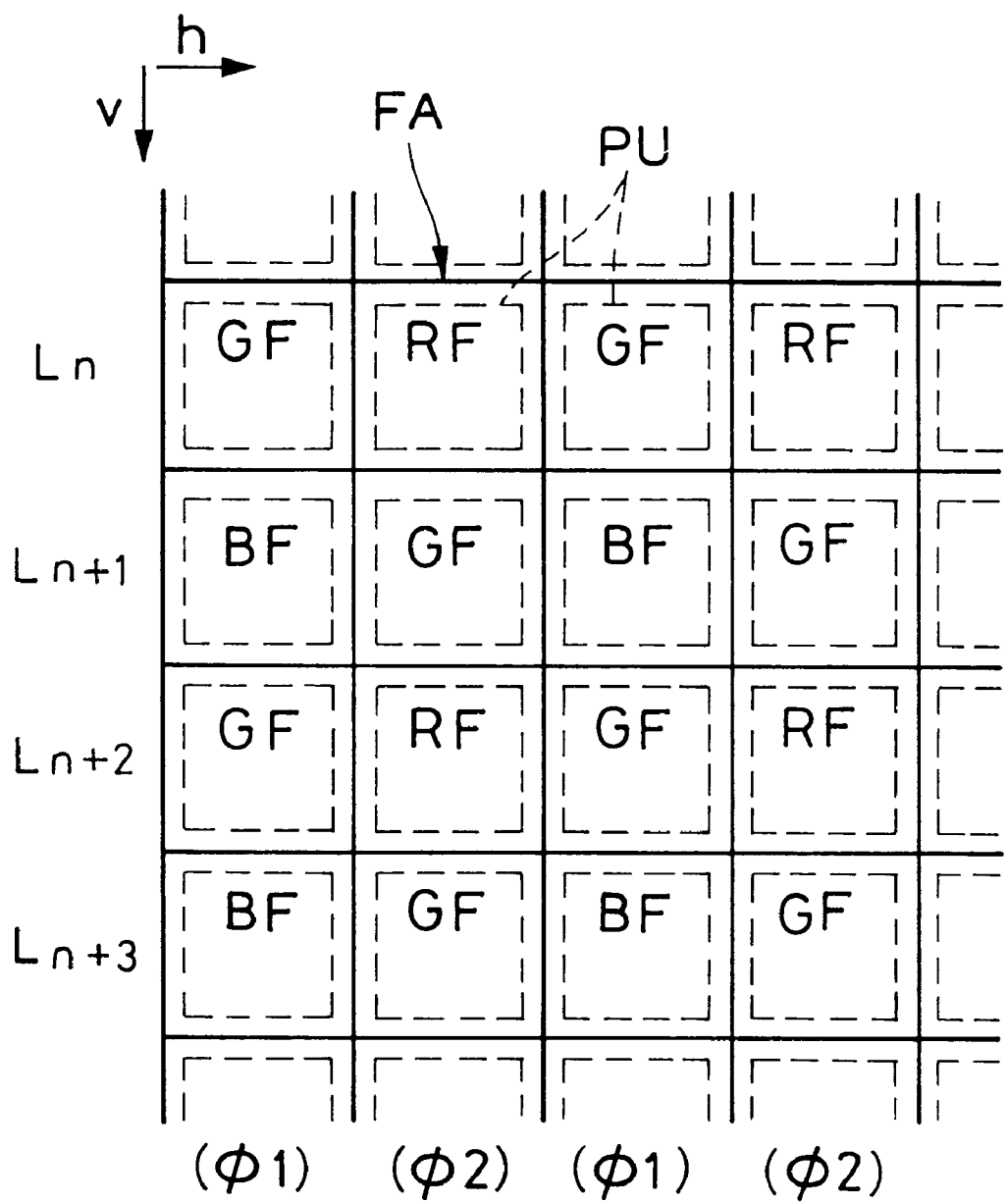

LUMINANCE SIGNAL PRODUCING CIRCUITS

BACKGROUND OF THE INVENTION

1. Field of the Invention

The present invention relates generally to luminance signal producing circuits, and is directed to an improvement in a luminance signal producing circuit for use in an apparatus in which an image pickup signal obtained from a solid-state image sensor having a color filter array on an image pick-up flat portion thereof is subjected to various signal-processes to produce luminance and chrominance signals constituting a color video signal.

2. Description of the Prior Art

There has been proposed a solid-state image sensor which has an image pickup flat portion comprising a matrix of two-dimensionally arrayed rows and columns of picture units each including a photoelectric transducer formed in a semiconductor substrate and charge transfer domains each comprising, for example, charge coupled devices (CCDs) formed also in the semiconductor substrate for transferring signal charges produced by the picture units. The solid-state image sensor is often employed in a color video camera for producing a color video signal.

In the color video camera in which the solid-state image sensor is employed, a color filter array is provided on the image pickup flat portion of the solid-state image sensor. The color filter array comprises a matrix of two-dimensionally arrayed rows and columns of color filter units corresponding to the picture units in the image pickup flat portion, respectively, and the light from an image impinges through each of the color filter units upon the corresponding one of the picture units.

The color filter units constituting the color filter array includes, for example, red filters, green filters and blue filters. Various positional arrangements of the red, green and blue filters of the color filter array have been proposed. In one of the positional arrangements of the color filter units, the green filters are checkered and the red and blue filters are arrayed in such a manner that a row of the green and red filters aligned one after the other and a row of the blue and green filters aligned one after the other are alternately made. This positional arrangement of the color filter units is called a checkered green-line sequential red and blue arrangement.

In the solid-state image sensor having the image pickup flat portion provided thereon with the color filter array, a signal charge corresponding to a red light component contained in the light from an image is produced to be stored in the picture unit upon which the light from the image impinges through the red filter, a signal charge corresponding to a green light component contained in the light from the image is produced to be stored in the picture unit upon which the light from the image impinges through the green filter, and a signal charge corresponding to a blue light component contained in the light from the image is produced to be stored in the picture unit upon which the light from the image impinges through the blue filter. Then, the signal charges stored in the picture units are read and transferred through the charge transfer domains each comprising the CCDs to an output portion from which an image pickup signal based on the signal charge read from the picture units is obtained. The image pickup signal thus obtained at the output portion contains a red signal component based on the signal charge read from the picture unit corresponding to the read filter, a green signal component based on the signal charge read from the picture unit corresponding to the green filter, and a blue signal component based on the signal charge read from the picture unit corresponding to the blue filter.

When a color video signal is produced based on the image pickup signal obtained from the solid-state image sensor, usually, luminance and chrominance signals which are signal components constituting the color video signal are formed respectively and then synthesized with each other to produce the color video signal. There have been proposed several different kinds of color video signals and one of them is a NTSC color video signal according to the NTSC color television system.

The NTSC color video signal comprises a luminance signal (Y) and a chrominance signal (C) and the chrominance signal (C) contains a red primary color signal (R), a green primary color signal (G) and a blue primary color signal (B). The relation between the luminance signal (Y) and the red, green and blue primary color signals (R, G and B) is expressed by the equation: $Y=0.3 \cdot R+0.59 \cdot G+0.11 \cdot B$. Accordingly, in the case where a NTSC video signal is intended to be produced based on an image pickup signal obtained from a solid-state image sensor under a condition in which red, green and blue primary color signals corresponding to red, green and blue signal components contained in the image pickup signal, respectively, are obtained, it seems that it would be necessary to apply the above mentioned relation expressed by the equation: $Y=0.3 \cdot R+0.59 \cdot G+0.11 \cdot B$ to a luminance signal. However, it is not always true in fact.

In practice, low and high frequency components of the luminance signal are separately processed as a low frequency luminance signal (YL) and a high frequency luminance signal (YH), respectively, and it has been proposed, with the intention of improving resolution of pictures reproduced in the strength of the luminance signal, to apply the above mentioned relation to the low frequency luminance signal YL in such a manner as $YL=0.3 \cdot R+0.59 \cdot G+0.11 \cdot B$ and another relation different from the above mentioned relation to the high frequency luminance signal YH in such a manner as, for example, $YH=0.25 \cdot R+0.5 \cdot G+0.25 \cdot B$.

However, when the relation expressed by the equation: $YH=0.25 \cdot R+0.5 \cdot G+0.25 \cdot B$ is applied to the high frequency luminance signal YH in process of producing the NTSC color video signal based on the image pickup signal obtained from the solid-state image sensor, the following disadvantage would be brought about.

In general, when the color video signal is produced based on the image pickup signal obtained from the solid-state image sensor, each of red, green and blue signal components of the image pickup signal corresponding to a plurality of picture units arrayed in the image pickup flat portion of the solid-state image sensor is obtained through a sampling process performed in response to each row of the picture units. The sampling process through which the red, green and blue signal components are obtained is carried out with a clock signal having a predetermined frequency. Therefore, each of red, green and blue primary color signals which are obtained to correspond to the red, green and blue signal components contained in the image pickup signal, respectively, contains a carrier signal component having a frequency corresponding to the frequency of the clock signal used for the sampling process.

The carrier signal component thus contained in each of the red, green and blue primary color signals is an unnecessary signal component to the luminance and chrominance signals which are produced based on the red, green and blue primary color signals and therefore it is desired for the luminance and chrominance signals to cancel the carrier signal component.

Under such circumstances, in the case where the relation expressed by the equation: YH=0.25·R+0.5·G+0.25·B is applied to the high frequency luminance signal YH, the carrier signal component is not cancelled in the high frequency luminance signal YH due to the values of the coefficients provided to R, G and B in the equation, respectively, so that it is feared that a folding distortion which generally results from a high frequency component intermixing with a low frequency component as a counterfeit signal component is brought about in the luminance signal Y containing the low frequency luminance signal YL and the high frequency luminance signal YH which reproduces a black and white picture. This folding distortion results in deteriorations in resolution of the picture reproduced based on the luminance signal Y.

As described above, it is difficult to achieve hi-fidelity luminance and improved resolution on the reproduced picture by means of the previously proposed signal processing in which the relation expressed by the equation: YL=0.3·R+0.59·G+0.11·B is applied to the low frequency luminance signal YL and the relation expressed by the equation: YH=0.25·R+0.5·G+0.25·B is applied to the high frequency luminance signal YH because the luminance signal Y containing the low frequency luminance signal YL and the high frequency luminance signal YH is adversely affected by the folding distortions.

OBJECTS AND SUMMARY OF THE INVENTION

Accordingly, it is an object of the present invention to provide a luminance signal producing circuit for use in an apparatus in which a color video signal comprising luminance and chrominance signals is produced based on an image pickup signal obtained from a solid-state image sensor which has an image pickup flat portion provided thereon with a color filter array comprising a matrix of two-dimensionally arrayed rows and columns of color filter units corresponding to picture units in the image pickup flat portion, respectively, which avoids the aforementioned difficulties encountered with the prior art.

Another object of the present invention is to provide a luminance signal producing circuit for use in an apparatus in which a color video signal comprising luminance and chrominance signals is produced based on an image pickup signal obtained from a solid-state image sensor which has an image pickup flat portion provided thereon with a color filter array comprising a matrix of two-dimensionally arrayed rows and columns of color filter units corresponding to picture units in the image pickup flat portion, respectively, which produces such a luminance as to contribute to realization of hi-fidelity luminance and improved resolution on pictures reproduced based on the color video signal in which the luminance signal is contained.

A further object of the present invention is to provide a luminance signal producing circuit for use in an apparatus in which a color video signal comprising luminance and chrominance signals is produced based on an image pickup signal obtained from a solid-state image sensor which has an image pickup flat portion provided thereon with a color filter array comprising a matrix of two-dimensionally arrayed rows and columns of color filter units corresponding to picture units in the image pickup flat portion, respectively, which produces such a luminance as to be able to suppress adverse effects of folding distortions resulting therefrom.

According to the present invention, there is provided a luminance signal producing circuit comprising a signal input portion to which an image pickup signal is supplied from a solid-state image sensor which has an image pickup flat portion comprising a matrix of two-dimensionally arrayed rows and columns of picture units and provided thereon with a color filter array comprising a plurality of color filter units arrayed in the manner of a checkered green-line sequential red and blue arrangement to correspond to the picture units, respectively, and is operative to produce red, green and blue signal components obtained respectively from the picture units forming each horizontal reading row in the image pickup flat portion so as to constitute the image pickup signal, a signal delaying portion for delaying the image pickup signal supplied to the signal input portion by one line period in stages, a wide band luminance signal generator for producing a wide band luminance signal based on delayed image pickup signals obtained from the signal delaying portion, a low frequency compensation luminance signal generator for producing a low frequency compensation luminance signal based on both of the image pickup signal supplied to the signal input portion and the delayed image pickup signals obtained from the signal delaying portion, and a signal synthesizer for synthesizing the wide band luminance signal and the low frequency compensation luminance signal obtained respectively from the wide band luminance signal generator and the low frequency compensation luminance signal generator with each other to produce a luminance signal, wherein the low frequency compensation luminance signal generator is operative to produce a first signal in which a vertical carrier signal component is cancelled and a second signal in which a horizontal carrier signal component is cancelled based on signals obtained from a vertical low pass filter to which the image pickup signal supplied to the signal input portion and the delayed image pickup signals obtained from the signal delaying portion are supplied, then operative to extract one of the first and second signals having a smaller absolute value when the first and second signals have the same polarity and none of the first and second signals or a signal corresponding to an average to the first and second signals when the first and second signals have respective polarities different from each other so as to have an extracted signal, and further operative to supply a horizontal low pass filter with the extracted signal to obtain the low frequency compensation luminance signal from the horizontal low pass filter.

In the luminance signal producing circuit thus constituted in accordance with the present invention, the wide band luminance signal and the low frequency compensation luminance signal are formed based on the image pickup signal containing the red, green and blue signal components and obtained from the solid-state image sensor which is provided with the color filter array comprising a plurality of color filter units arrayed in the manner of the checkered green-line sequential red and blue arrangement, and the luminance signal is produced by synthesizing the wide band luminance signal and the low frequency compensation luminance signal with each other. The low frequency compensation luminance signal is formed through the first process wherein the first signal in which the vertical carrier signal component is cancelled and the second signal in which the horizontal carrier signal component is cancelled are produced based on the signals obtained from the vertical low pass filter to which the image pickup signal supplied to the signal input portion and the delayed image pickup signals obtained from the signal delaying portion are supplied, the second process wherein one of the first and second signals having the smaller absolute value is extracted when the first and second signals have the same polarity and none of the first and second signals or the signal corresponding to the average of the first and second signals is extracted when the first and second signals have respective polarities different from each other, and the third process wherein the extracted signal is supplied to the horizontal low pass filter to obtain the low frequency compensation luminance signal from the horizontal low pass filter.

The low frequency compensation luminance signal thus obtained corresponds to a low frequency component of a difference between a low frequency luminance signal and the wide band luminance signal, and therefore adverse effects of folding distortions resulting from a high frequency luminance signal are suppressed in the luminance signal which is produced by synthesizing the wide band luminance signal and the low frequency compensation luminance signal with each other. Consequently, with the luminance signal producing circuit according to the present invention, such a luminance as to contribute to realization of hi-fidelity luminance and improved resolution on pictures reproduced based on the color video signal in which the luminance signal is contained can be obtained.

The above, and other objects, features and advantages of the present invention will become apparent from the following detailed description taken in conjunction with the accompanying drawings.

BRIEF DESCRIPTION OF THE DRAWINGS

FIG. 2 is a schematic illustration used for explaining a matrix of two-dimensionally arrayed rows and columns of picture units and an example of a color filter array provided on the array of picture units in a solid-state image sensor which is employed in an example of a color video signal producing apparatus to which a luminance signal producing circuit according to the present invention can be applied;

DESCRIPTION OF THE PREFERRED EMBODIMENT

Figure 1:
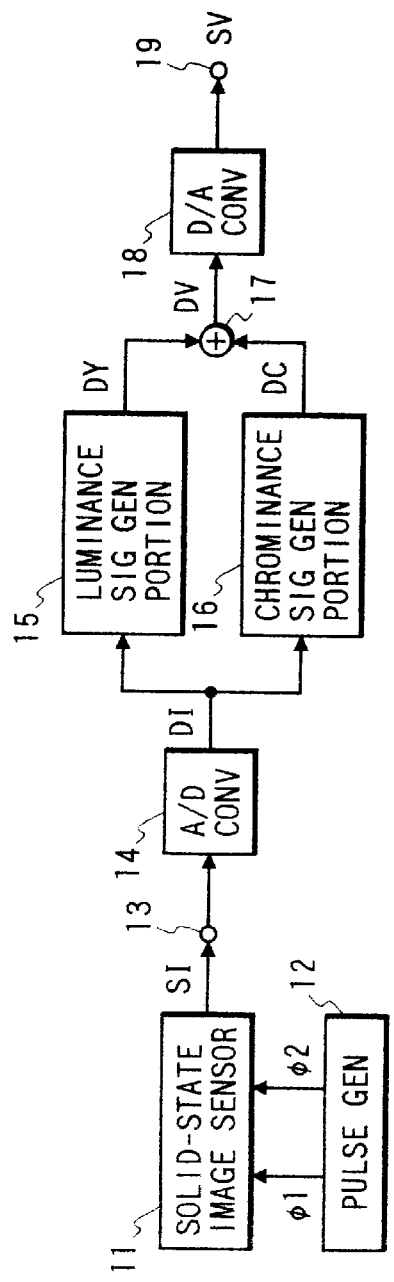
FIG. 1 is a schematic block diagram showing an example of a color video signal producing apparatus to which a luminance signal producing circuit according to the present invention can be applied.

FIG. 1 shows an example of a color video signal producing apparatus provided with a solid-state image sensor, to which a luminance signal producing circuit according to the present invention can be applied.

In the color video signal producing apparatus shown in FIG. 1, a solid-state image sensor 11 is provided. The solid-state image sensor 11 has an image pickup flat portion comprising a matrix of two-dimensionally arrayed rows and columns of picture units and a color filter array FA comprising a plurality of primary color filters arranged as shown in FIG. 2, for example, and provided on the image pickup flat portion.

The color filter array FA shown in FIG. 2 comprises a mosaic matrix of two-dimensionally arrayed rows and columns of red filters RF, green filters GF and blue filters BF. These red filters RF, green filters GF and blue filters BF are two-dimensionally arrayed in a horizontal direction indicated by an arrow h in FIG. 2 and a vertical direction indicated by an arrow v in FIG. 2 to correspond to a plurality of picture units PU two-dimensionally arrayed in the horizontal and vertical directions, as shown with broken rectangles in FIG. 2. Further, the red filters RF, green filters GF and blue filters BF are arrayed in the manner of the checkered green-line sequential red and blue arrangement in which the green filters GF are checkered and the red filters RF and blue filters BF are arrayed in such a manner that a horizontal row of the green filters GF and red filters RF aligned one after the other and a horizontal row of the blue filters BF and green filters GF aligned one after the other are alternately made.

In the image pickup flat portion of the solid-state image sensor 11, a light from an image to be picked up impinges through the red filters RF upon the picture units PU corresponding to the red filters RF (R picture units), through the green filters GF upon the picture units PU corresponding to the green filters GF (G picture units) and through the blue filters BF upon the picture units PU corresponding to the blue filters BF (B picture units), so that a signal charge is produced to be stored in each of the R picture units, G picture units and B picture units. Then, the signal charges stored in the R, G and B picture units are read at predetermined timing and transferred through charge transfer domains each comprising, for example, CCDs to an output portion of the solid-state image sensor 11. As a result, an image pickup signal SI which is formed by extracting a red signal component based on the signal charge from the R picture units, a green signal component based on the signal charge from the G picture units and a blue signal component based on the signal charge from the B picture units selectively through sampling is obtained at the output portion of the solid-state image sensor 11. The selective extractions of the red, green and blue signal components through sampling are carried out in accordance with two-phase clock pulses ø1 and ø2 which are opposite in phase to each other and supplied from a pulse generator 12 to the solid-state image sensor 11.

The selective extractions of the red, green and blue signal components through sampling in accordance with the clock pulses ø1 and ø2 are carried out every field period of the image pickup signal SI. In each field period, the selective extractions of the red, green and blue signal components through sampling in accordance with the clock pulses ø1 and ø2 are conducted successively in relation to horizontal picture unit rows Ln, Ln+1, Ln+2, Ln+3 . . . (n is a positive integer) corresponding to horizontal color filter rows in the color filter array FA, respectively, as shown in FIG. 2. In each of the horizontal picture unit rows Ln, Ln+1, Ln+2, Ln+3 . . . , the red, green or blue signal component from the R, G or B picture unit is extracted in accordance with the clock pulses ø1 and ø2 so that the R, G or B picture unit from which the red, green or blue signal component is obtained to be extracted moves successively in the horizontal direction.

For example, in case of each of the horizontal picture unit rows Ln, Ln+2 . . . , the green signal component from the G picture unit and the red signal component from the R picture unit are alternately extracted through sampling in accordance with the clock pulses ø1 and ø2, and in case of each of the horizontal picture unit rows Ln+1, Ln+3 . . . , the blue signal component from the B picture unit and the green signal component from the G picture unit are alternately extracted through sampling in accordance with the clock pulses ø1 and ø2. In the manner described above, the selective extractions of the red, green and blue signal components through sampling are carried out with a sampling period Ts which corresponds to a half of the period of each of the clock pulses ø1 and ø2. A period for extracting the green and red signal components or the green and blue signal components from the whole picture units in each of the horizontal picture unit rows Ln, Ln+1, Ln+2, Ln+3 . . . , namely a period for extracting the green and red signal components or the green and blue signal components from each horizontal reading row is set to be equal to one line period (1 H) of the image pickup signal SI.

The image pickup signal SI containing the red, green and blue signal components obtained from the R, G and B picture units, respectively, and extracted selectively through sampling with the sampling period Ts as mentioned above is supplied from the output portion of the solid-state image sensor 11 to a signal input terminal 13. The image pickup signal SI supplied through the signal input terminal 13 is digitalized at an analog to digital (A/D) converter 14 to form a digital image pickup signal DI containing a red primary color signal (R), a green primary color signal (G) and a blue primary color signal (B) obtained respectively based on the red, green and blue signal components which are extracted selectively through sampling with the sampling period Ts. The digital image pickup signal DI obtained from the A/D converter 14 is supplied to a luminance signal generating portion 15 and a chrominance signal generating portion 16. In the luminance signal generating portion 15, a luminance signal DY is produced based on the digital image pickup signal DI, and in the chrominance signal generating portion 16, a chrominance signal DC is produced based on the digital image pickup signal DI.

The luminance signal DY obtained from the luminance signal generating portion 15 and the chrominance signal DC obtained from the chrominance signal generating portion 16 are supplied to a signal synthesizer 17 and synthesized therein to form a digital color video signal DV. The digital color video signal DV obtained from the signal synthesizer 17 is converted to an analog signal in a digital to analog (D/A) converter 18 and the analog signal is derived from the D/A converter 18 to a signal output terminal 19 as a color video signal SV.

Figure 3:
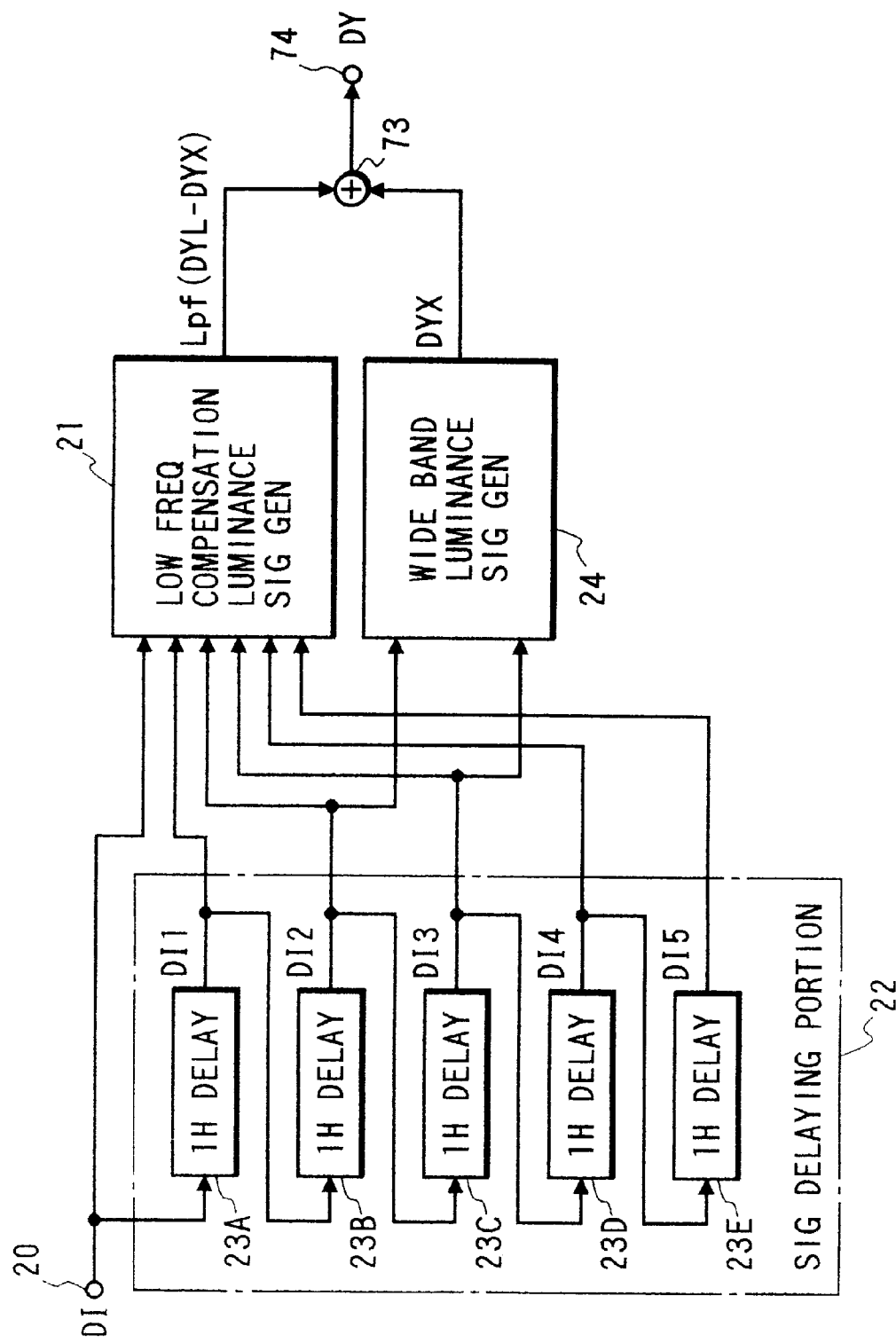
FIG. 3 is a schematic block diagram showing an embodiment of luminance signal producing circuit according to the present invention.

The luminance signal generating portion 15 employed in the above mentioned color video signal producing apparatus which includes the solid-state image sensor 11 as shown in FIG. 1 is constituted by an embodiment of luminance signal producing circuit according to the present invention. FIG. 3 shows the embodiment of luminance signal producing circuit according to the present invention for use in the color video signal producing apparatus shown in FIG. 1.

Referring to FIG. 3, the digital image pickup signal DI containing the red primary color signal (R), green primary color signal (G) and blue primary color signal (B) and obtained from the A/D converter 14 in the color video signal producing apparatus shown in FIG. 1 is supplied through a terminal 20 to a low frequency compensation luminance signal generator 21 and a signal delaying portion 22.

The signal delaying portion 22 comprises 1 H delay devices 23A, 23B, 23C, 23D and 23E each operative to delay a signal supplied thereto by 1H and produces a delayed image pickup signal DI1 obtained by delaying the digital image pickup signal DI by 1 H, a delayed image pickup signal DI2 obtained by delaying the digital image pickup signal DI by 2 H, a delayed image pickup signal DI3 obtained by delaying the digital image pickup signal DI by 3 H, a delayed image pickup signal DI4 obtained by delaying the digital image pickup signal DI by 4 H, and a delayed image pickup signal DI5 obtained by delaying the digital image pickup signal DI by 5 H. These delayed image pickup signals DI1, DI2, DI3, DI4 and DI5 are supplied to the low frequency compensation luminance signal generator 21 and the delayed image pickup signals DI2 and DI3 are supplied to a wide band luminance signal generator 24.

Figure 4:
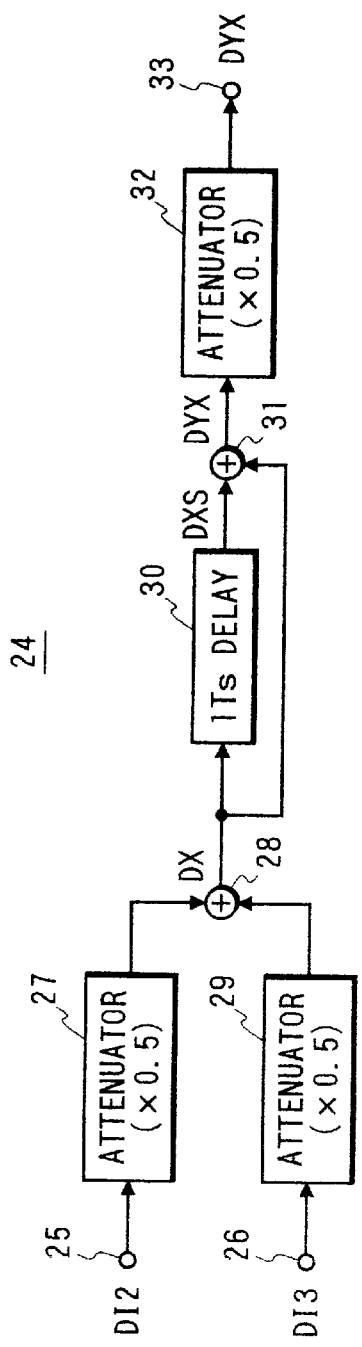
FIG. 4 is a schematic block diagram showing an example of a wide band luminance signal producing portion of the embodiment shown in FIG. 3.

The wide band luminance signal generator 24 is constituted, for example, as shown in FIG. 4. In the example of the wide band luminance signal generator 24 shown in FIG. 4, the delayed image pickup signal DI2 from the signal delaying portion 22 is supplied through a terminal 25 to an attenuator 27 and the delayed image pickup signal DI3 from the signal delaying portion 22 is supplied through a terminal 26 to an attenuator 29. The attenuator 27 is operative to attenuate the level of the delayed image pickup signal DI2 to half and the attenuator 29 is operative to attenuate the level of the delayed image pickup signal DI3 to half. The delayed image pickup signals DI2 and DI3 each reduced in level to half are supplied to a signal synthesizer 28 from the attenuators 27 and 29, respectively.

In the signal synthesizer 28, the delayed image pickup signal DI2 and the delayed image pickup signal DI3 are synthesized with each other to produce a synthesized image pickup signal DX. The synthesized image pickup signal DX obtained from the signal synthesizer 28 is supplied directly to another signal synthesizer 31 and supplied also through a 1 Ts delay device 30, which is operative to delay a signal supplied thereto by a period corresponding to the sampling period Ts, to the signal synthesizer 31 as a delayed synthesized image pickup signal DXS. In the signal synthesizer 31, the synthesized image pickup signal DX and the delayed synthesized image pickup signal DXS are synthesized with each other to produce a synthesized signal DYX. The synthesized signal DYX obtained from the signal synthesizer 31 is attenuated in level to half in an attenuator 32 and derived to an output terminal 33.

In the wide band luminance signal generator 24 shown in FIG. 4, the red primary color signal (R), green primary color signal (G) and blue primary color signal (B) which are based respectively on the red signal component, green signal component and blue signal component obtained from four picture units and extracted through sampling with the sampling period Ts are synthesized with one another. The four picture units are a first couple of mutually adjacent picture units (the G picture unit and the R picture unit or the G picture unit and the B picture unit) and a second couple of mutually adjacent picture units (the B picture unit and the G picture unit or the G picture unit and the R picture unit). The first couple of mutually adjacent picture units belong to a first one of the horizontal picture unit row Ln, Ln+1, Ln+2, Ln+3 . . . , for example, the horizontal picture unit row Ln, and the second couple of mutually adjacent picture units belong to a second one of the horizontal picture unit row Ln, Ln+1, Ln+2, Ln+3 . . . , which is next to the first one of the horizontal picture unit row Ln, Ln+1, Ln+2, Ln+3 . . . , for example, the horizontal picture unit row Ln+1, and are put on the respective horizontal positions corresponding to the first couple of mutually adjacent picture units.

In such a case, since the four picture units of the first and second couples of mutually adjacent picture units always include two G picture units, one R picture unit and one B picture unit, the red primary color signal (R) based on the red signal component obtained from one R picture unit and extracted through sampling, the green primary color signal (G) based on the green signal components obtained respectively from two G picture units and each extracted through sampling, and the blue primary color signal (B) based on the blue signal component obtained from one B picture unit are synthesized with one another in the wide band luminance signal generator 24. Accordingly, the synthesized signal DYX obtained at the output terminal 33 of the wide band luminance signal generator 24 is expressed by the sum of R, G and B in which the coefficient for G is twice as large as that for each of R and B. That is, the synthesized signal DYX is expressed by the equation: DYX=0.25·R+0.5·G+0.25·B.

The synthesized signal DYX thus obtained at the output terminal 33 of the wide band luminance signal generator 24 forms a wide band luminance signal. Consequently, the wide band luminance signal DYX which is expressed by the equation: DYX=0.25·R+0.5·G+0.25·B is obtained at the output terminal 33 of the wide band luminance signal generator 24.

Figure 5:
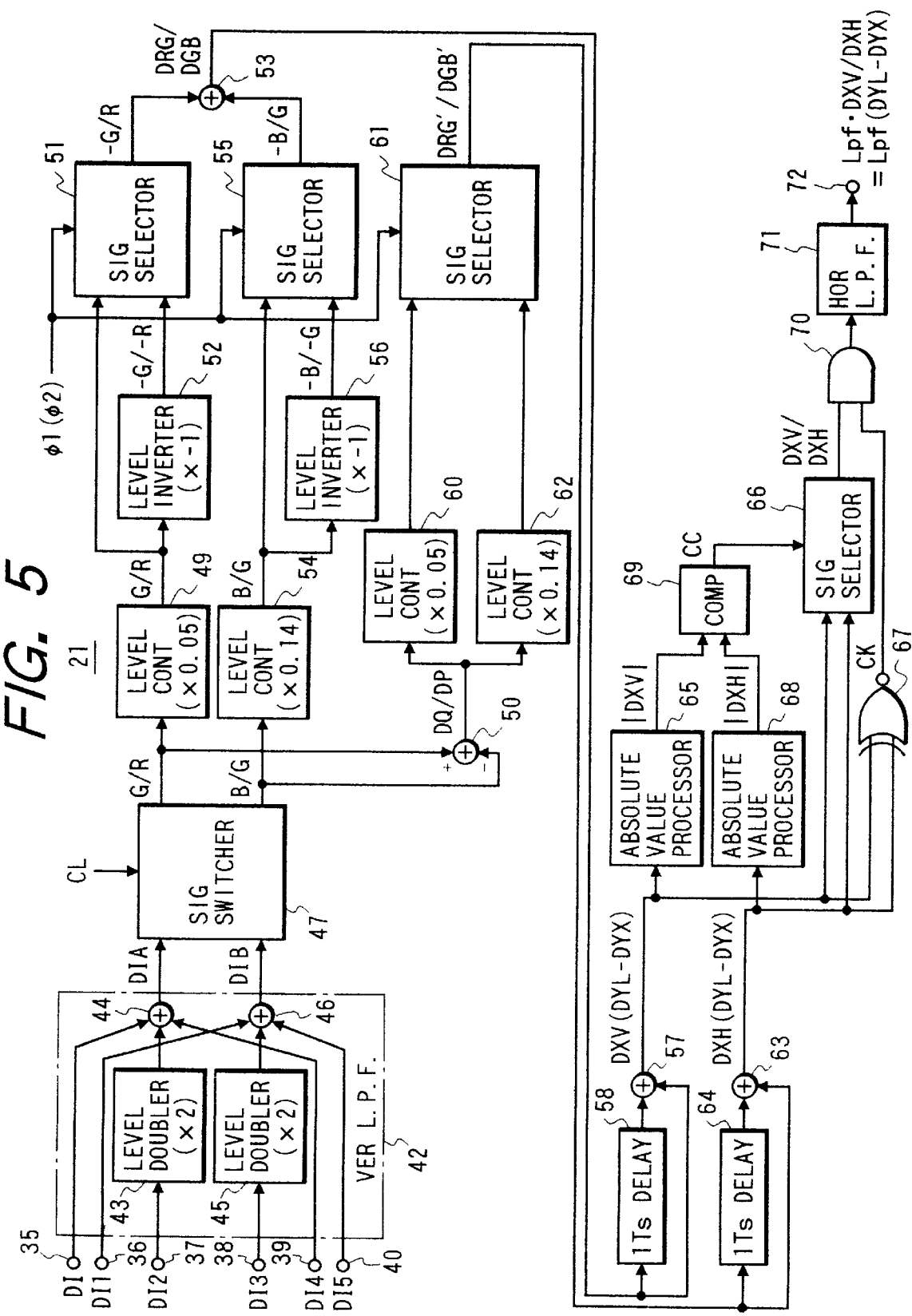
FIG. 5 is a schematic block diagram showing an example of a low frequency compensation luminance signal producing portion of the embodiment shown in FIG. 3.

The low frequency compensation luminance signal generator 21 is constituted, for example, as shown in FIG. 5. In the example of the low frequency compensation luminance signal generator 21 shown in FIG. 5, the digital image pickup signal DI containing the red primary color signal (R), green primary color signal (G) and blue primary color signal (B) and obtained from the A/D converter 14 in the color video signal producing apparatus shown in FIG. 1 is supplied to a terminal 35, and the delayed image pickup signal DI1 obtained by delaying the digital image pickup signal DI by 1 H, the delayed image pickup signal DI2 obtained by delaying the digital image pickup signal DI by 2H, the delayed image pickup signal DI3 obtained by delaying the digital image pickup signal DI by 3 H, the delayed image pickup signal DI4 obtained by delaying the digital image pickup signal DI by 4 H and the delayed image pickup signal DI5 obtained by delaying the digital image pickup signal DI by 5 H are supplied to terminals 36, 37, 38, 39 and 40, respectively.

The digital image pickup signal DI having passed through the terminal 35 and the delayed image pickup signals DI1, DI2, DI3, DI4 and DI5 having passed the terminals 36, 37, 38, 39 and 40, respectively, are supplied to a vertical low pass filter (vertical LPF) 42. In the vertical LPF 42, the digital image pickup signal DI, the delayed image pickup signal DI2 having been doubled in level by a level doubler 43, and the delayed image pickup signal DI4 are synthesized with one another in a signal synthesizer 44, and the delayed image pickup signal DI1, the delayed image pickup signal DI3 having been doubled in level by a level doubler 45, and the delayed image pickup signal DI5 are synthesized with one another in a signal synthesizer 46.

In the signal synthesizer 44, the red primary color signals (R), green primary color signals (G) or blue primary color signals (B) which are based respectively on the red signal components, green signal components or blue signal components obtained from three picture units and extracted through sampling with the sampling period Ts are synthesized with one another to produce a synthesized signal DIA. These three picture units belong to three every other ones of the horizontal picture unit rows Ln, Ln+1, Ln+2, Ln+3 . . . , as shown in FIG. 2, in the image pickup flat portion of the solid-state image sensor 11, for example, the horizontal picture unit rows Ln, Ln+2 and Ln+4, respectively, and are put on the respective horizontal positions in the subject three horizontal picture unit rows. The three picture units belong to the horizontal picture unit rows Ln, Ln+2, Ln+4, respectively, produce the green signal components from which the green primary color signals (G) are formed or the red signal components from which the red primary color signals (R) are formed. The synthesized signal DIA obtained from the signal synthesizer 44 to form a synthesized red primary color signals (R), synthesized green primary color signals (G) or synthesized blue primary color signals (B) is supplied to a signal switcher 47.

Similarly, in the signal synthesizer 46, the red primary color signals (R), green primary color signals (G) or blue primary color signals (B) which are based respectively on the red signal components, green signal components or blue signal components obtained from another three picture units and extracted through sampling with the sampling period Ts are synthesized with one another to produce a synthesized signal DIB. These three picture units belong to another three every other ones of the horizontal picture unit rows Ln, Ln+1, Ln+2, Ln+3 . . . , as shown in FIG. 2, in the image pickup flat portion of the solid-state image sensor 11, for example, the horizontal picture unit rows Ln+1, Ln+3 and Ln+5, respectively, and are put on the respective horizontal positions in the subject three horizontal picture unit rows. The three picture units belong to the horizontal picture unit rows Ln+1, Ln+3, Ln+5, respectively, produce the blue signal components from which the blue primary color signals (B) are formed or the green signal components from which the green primary color signals (G) are formed. The synthesized signal DIB obtained from the signal synthesizer 46 to form a synthesized red primary color signal (R), synthesized green primary color signal (G) or synthesized blue primary color signal (B) is supplied to the signal switcher 47.

The signal switcher 47 is operative to switch the synthesized signal DIA obtained from the signal synthesizer 44 and the synthesized signal DIB obtained from the signal synthesizer 46 every period of 1 H in response to a control signal CL so that the synthesized signal DIA and the synthesized signal DIB each forming the synthesized green primary color signal (G) or the synthesized red primary color signal (R) are obtained at one of two output ends of the signal switcher 47 during each period of 1 H and the synthesized signal DIB and the synthesized signal DIA each forming the synthesized blue primary color signal (B) or the synthesized green primary color signal (G) are obtained at the other of two output ends of the signal switcher 47 during each period of 1 H. Accordingly, the synthesized green primary color signal (G) and the synthesized red primary color signal (R) are alternately obtained every sampling period Ts from one of the output ends of the signal switcher 47 and the synthesized blue primary color signal (B) and the synthesized green primary color signal (G) are alternately obtained every sampling period Ts from the other of the output ends of the signal switcher 47.

The synthesized green primary color signal (G) or the synthesized red primary color signal (R) obtained from one of the output ends of the signal switcher 47 is supplied to a level controller 49 and a signal subtractor 50. In the level controller 49, the synthesized green primary color signal (G) or the synthesized red primary color signal (R) is reduced in level to 0.05 times to produce a level controlled green primary color signal (G) or a level controlled red primary color signal (R). The level controlled green primary color signal (G) or the level controlled red primary color signal (R) is supplied directly to a signal selector 51 and supplied also through a level inverter 52, which is operative to invert in level a signal supplied thereto, to the signal selector 51 as an inverted green primary color signal (−G) or an inverted red primary color signal (−R).

The signal selector 51 is operative to select the synthesized green primary color signal (G) or the synthesized red primary color signal (R) obtained from the level controller 49 and the inverted green primary color signal (–G) or the inverted red primary color signal (–R) to be extracted alternately every sampling period Ts in response to the clock pulse ø1 or ø2. As a result, the inverted green primary color signal (–G) reduced in level to 0.05 times and the synthesized red primary color signal (R) reduced in level to 0.05 times are obtained alternately every sampling period Ts at an output end of the signal selector 51 to be supplied to a signal synthesizer 53.

The synthesized blue primary color signal (B) or the synthesized green primary color signal (G) obtained from the other of the output ends of the signal switcher 47 is supplied to a level controller 54 and the signal subtractor 50. In the level controller 54, the synthesized blue primary color signal (B) or the synthesized green primary color signal (G) is reduced in level to 0.14 times to produce a level controlled blue primary color signal (B) or a level controlled green primary color signal (G). The level controlled blue primary color signal (B) or the level controlled green primary color signal (G) is supplied directly to a signal selector 55 and supplied also through a level inverter 56, which is operative to invert in level a signal supplied thereto, to the signal selector 55 as an inverted blue primary color signal (–B) or an inverted green primary color signal (–G).

The signal selector 55 is operative to select the synthesized blue primary color signal (B) or the synthesized green primary color signal (G) obtained from the level controller 54 and the inverted blue primary color signal (—B) or the inverted green primary color signal (–G) to be extracted alternately every sampling period Ts in response to the clock pulse ø1 or ø2. As a result, the inverted blue primary color signal (–B) reduced in level to 0.14 times and the synthesized green primary color signal (G) reduced in level to 0.14 times are obtained alternately every sampling period Ts at an output end of the signal selector 55 to be supplied to the signal synthesizer 53.

In the signal synthesizer 53, the adding synthesis of the inverted green primary color signal (–G) reduced in level to 0.05 times and the inverted blue primary color signal (–B) reduced in level to 0.14 times and the adding synthesis of the synthesized red primary color signal (R) reduced in level to 0.05 times and the synthesized green primary color signal (G) reduced in level to 0.14 times are carried out alternately every sampling period Ts and thereby an addition-synthesized signal DGB and an addition-synthesized signal DRG are produced alternately every sampling period Ts.

The synthesized signals DGB and DRG are supplied directly to a signal synthesizer 57 and supplied also through a 1 Ts delay device 58, which is operative to delay a signal supplied thereto by a period corresponding to the sampling period Ts, to the signal synthesizer 57 as a delayed synthesized signal DGB and a delayed synthesized signal DRG. In the signal synthesizer 57, the synthesized signal DGB and the delayed synthesized signal DRG or the delayed synthesized signal DGB and the synthesized signal DRG are synthesized with each other. That is, the inverted green primary color signal (–G) reduced in level to 0.05 times, the inverted blue primary color signal (–B) reduced in level to 0.14 times, the synthesized red primary color signal (R) reduced in level to 0.05 times and the synthesized green primary color signal (G) reduced in level to 0.14 times are synthesized with one another to produce a synthesized signal DXV which is composed of the synthesized red primary color signal (R) reduced in level to 0.05 times, the synthesized green primary color signal (G) reduced in level to 0.09 times, and the inverted blue primary color signal (–B) reduced in level to 0.14 times.

The synthesized signal DXV thus obtained is expressed by the equation: $DXV = 0.05 \cdot R + 0.09 \cdot G - 0.14 \cdot B$. Supposing a low frequency luminance signal DYL is expressed by the equation: $DYL = 0.3 \cdot R + 0.59 \cdot G + 0.11 \cdot B$, the synthesized signal DXV corresponds to a signal DYL–DYX which is obtained by subtracting the wide band luminance signal DYX produced in the wide band luminance signal generator 24 shown in FIG. 3 from the low frequency luminance signal DYL. That is, the relation: $DYL - DYX = (0.3 \cdot R + 0.59 \cdot G + 0.11 \cdot B) - (0.25 \cdot R + 0.5 \cdot G + 0.25 \cdot B) = 0.05 \cdot R + 0.09 \cdot G - 0.14 \cdot B = DXV$ is satisfied.

Further, a condition in which the synthesized signal DXV obtained the signal synthesizer 57 comprises the inverted green primary color signal (–G) reduced in level to 0.05 times, the inverted blue primary color signal (–B) reduced in level to 0.14 times, the synthesized red primary color signal (R) reduced in level to 0.05 times and delayed by the period corresponding to the sampling period Ts, and the synthesized green primary color signal (G) reduced in level to 0.14 times and delayed by the period corresponding to the sampling period Ts, wherein the synthesized red primary color signal (R) and the synthesized green primary color signal (G) are added to the inverted green primary color signal (–G) and the inverted blue primary color signal (–B), and a condition in which the synthesized signal DXV obtained the signal synthesizer 57 comprises the synthesized red primary color signal (R) reduced in level to 0.05 times, and the synthesized green primary color signal (G) reduced in level to 0.14 times, and the inverted green primary color signal (–G) reduced in level to 0.05 times and delayed by the period corresponding to the sampling period Ts, and the inverted blue primary color signal (–B) reduced in level to 0.14 times and delayed by the period corresponding to the sampling period Ts, wherein the inverted green primary color signal (–G) and the inverted blue primary color signal (–B) are added to the synthesized red primary color signal (R) and the synthesized green primary color signal (G), are brought about alternately every sampling period Ts. Therefore, the synthesized signal DXV obtained the signal synthesizer 57 is such a signal as to have been produced based on the synthesized signals DIA and DIB obtained from the vertical LPF 42 and to have been subjected to a cancelling process for cancelling vertical carrier signal components.

In the signal subtractor 50 to which the synthesized green primary color signal (G) or the synthesized red primary color signal (R) obtained from one of the output ends of the signal switcher 47 and the synthesized blue primary color signal (B) or the synthesized green primary color signal (G) obtained from the other of the output ends of the signal switcher 47 are supplied, the synthesized blue primary color signal (B) is subtracted from the synthesized green primary color signal (G) to produce a subtraction-synthesized signal DP or the synthesized blue primary color signal (B) is subtracted from the synthesized green primary color signal (G) to produce a subtraction-synthesized signal DQ. As a result, the subtraction-synthesized signals DP and DQ are obtained alternately every sampling period Ts from the signal subtractor 50.

Each of the subtraction-synthesized signals DP and DQ is reduced in level to 0.05 times in a level controller 60 to be supplied to a signal selector 61 and also reduced in level to 0.14 times in a level controller 62 to be supplied to the signal selector 61. The signal selector 61 is operative to select the subtraction-synthesized signals DP and DQ each having been subjected to the level control in the level controller 60 and the subtraction-synthesized signals DP and DQ each having been subjected to the level control in the level controller 62 to be extracted alternately every sampling period Ts in response to the clock pulse ø1 or ø2. As a result, a subtraction-synthesized signal DGB' formed by subtracting the blue primary color signal (B) reduced in level to 0.14 times from the green primary color signal (G) reduced in level to 0.14 times and a subtraction-synthesized signal DRG' formed by subtracting the green primary color signal (G) reduced in level to 0.05 times from the red primary color signal (R) reduced in level to 0.05 times are obtained alternately every sampling period Ts at an output end of the signal selector 61.

The subtraction-synthesized signals DGB' and DRG' are supplied directly to a signal synthesizer 63 and supplied also through a 1 Ts delay device 64, which is operative to delay a signal supplied thereto by a period corresponding to the sampling period Ts, to the signal synthesizer 63 as a delayed subtraction-synthesized signal DGB' and a delayed subtraction-synthesized signal DRG'. In the signal synthesizer 63, the subtraction-synthesized signal DGB' and the delayed subtraction-synthesized signal DRG' or the delayed subtraction-synthesized signal DGB' and the subtraction-synthesized signal DRG' are synthesized with each other. That is, a condition wherein a signal which is formed by subtracting the blue primary color signal (B) reduced in level to 0.14 times from the green primary color signal (G) reduced in level to 0.14 times and delayed by the sampling period Ts is added to a signal which is formed by subtracting the green primary color signal (G) reduced in level to 0.05 times from the red primary color signal (R) reduced in level to 0.05 times, and a condition wherein a signal which is formed by subtracting the green primary color signal (G) reduced in level to 0.05 times from the red primary color signal(R) reduced in level to 0.05 times and delayed by the sampling period Ts is added to a signal which is formed by subtracting the blue primary color signal (B) reduced in level to 0.14 times from the green primary color signal (G) reduced in level to 0.14 times, are brought about alternately every sampling period Ts. Therefore, a synthesized signal DXH comprising the red primary color signal(R) reduced in level to 0.05 times, the green primary color signal (G) reduced in level to 0.09 times, and the blue primary color signal (B) reduced in level to −0.14 times is produced in the signal synthesizer 63.

The synthesized signal DXH thus obtained is expressed by the equation: DXH=0.05·R+0.09·G−0.14·B. Supposing the low frequency luminance signal DYL is expressed by the equation: DYL=0.3·R+0.59·G+0.11·B, the synthesized signal DXH corresponds to a signal DYL-DYX which is obtained by subtracting the wide band luminance signal DYX produced in the wide band luminance signal generator 24 shown in FIG. 3 from the low frequency luminance signal DYL. That is, the relation: DYL−DYX=(0.3·R+0.59·G+0.11·B)−(0.25·R+0.5·G+0.25·B)=0.05·R+0.09·G−0.14·B=DXH is satisfied.

Further, a condition in which the synthesized signal DXH obtained the signal synthesizer 63 comprises the red primary color signal (R) reduced in level to 0.05 times, the green primary color signal (G) reduced in level to 0.05 times, the green primary color signal (G) reduced in level to 0.14 times and delayed by the sampling period Ts, and the synthesized blue primary color signal (B) reduced in level to 0.14 times and delayed by the period corresponding to the sampling period Ts, wherein the synthesized green primary color signal (G) is subtracted from the red primary color signal (R) to produce a first subtraction output signal, the blue primary color signal (B) reduced in level to 0.14 times and delayed by the period corresponding to the sampling period Ts is subtracted from the green primary color signal (G) reduced in level to 0.14 times and delayed by the sampling period Ts to produce a second subtraction output signal, and the second subtraction output signal is added to the first subtraction output signal, and a condition in which the synthesized signal DXH obtained the signal synthesizer 63 comprises the green primary color signal (G) reduced in level to 0.14 times, the blue primary color signal (B) reduced in level to 0.14 times, the red primary color signal (R) reduced in level to 0.05 times and delayed by the sampling period Ts, and the synthesized green primary color signal (G) reduced in level to 0.14 times and delayed by the period corresponding to the sampling period Ts, wherein the synthesized blue primary color signal (B) is subtracted from the green primary color signal (G) to produce a first subtraction output signal, the green primary color signal (G) reduced in level to 0.14 times and delayed by the period corresponding to the sampling period Ts is subtracted from the red primary color signal (R) reduced in level to 0.14 times and delayed by the sampling period Ts to produce a second subtraction output signal, and the second subtraction output signal is added to the first subtraction output signal, are brought about alternately every sampling period Ts. Therefore, the synthesized signal DXH obtained the signal synthesizer 63 is such a signal as to have been produced based on the synthesized signals DIA and DIB obtained from the vertical LPF 42 and to have been subjected to a cancelling process for cancelling horizontal carrier signal components.

The synthesized signal DXV obtained the signal synthesizer 57 is supplied to an absolute value processor 65, a signal selector 66 and an exclusive NOR gate 67 and the synthesized signal DXH obtained the signal synthesizer 63 is supplied to an absolute value processor 68, the signal selector 66 and the exclusive NOR gate 67. The absolute value processor 65 is operative to produce based on the synthesized signal DXV an absolute value signal |DXV| which represents an absolute value of the synthesized signal DXV and to supply a comparator 69 with the absolute value signal |DXV|. Similarly, the absolute value processor 68 is operative to produce based on the synthesized signal DXH an absolute value signal |DXH| which represents an absolute value of the synthesized signal DXH and to supply the comparator 69 with the absolute value signal |DXH|.

In the comparator 69, the absolute value signal |DXV| and the absolute value signal |DXH| are compared with each other and a comparison output signal CC which has a high level when the absolute value signal |DXV| is smaller than or equal to the absolute value signal |DXH| and a low level when the absolute value signal |DXV| is larger than the absolute value signal |DXH| is produced to be supplied to a signal selector 66. In the signal selector 66 to which the comparison output signal CC is supplied in addition to the synthesized signal DXV obtained the signal synthesizer 57 and the synthesized signal DXH obtained the signal synthesizer 63, the synthesized signal DXV is obtained at an output end thereof when the absolute value signal |DXV| is smaller than or equal to the absolute value signal |DXH| and therefore the comparison output signal CC has the high level, and the synthesized signal DXH is obtained at the output end thereof when the absolute value signal |DXV| is larger than the absolute value signal |DXH| and therefore the comparison output signal CC has the low level.

Accordingly, from the signal selector 66, a smaller one of the synthesized signals DXV and DXH is obtained when the synthesized signal DXH is different from the synthesized signal DXV and the synthesized signal DXV is obtained when the synthesized signal DXH is equal to the synthesized signal DXV. The synthesized signal DXV or DXH obtained from the signal selector 66 is supplied to an AND gate 70.

Further, a discrimination signal CK which has a high level when the synthesized signals DXV and DXH have the same polarity and a low level when the synthesized signals DXV and DXH have respective polarities different from each other is obtained from the exclusive NOR gate 67 and supplied to the AND gate 70. The AND gate 70 is in an ON state to lead the synthesized signal DXV or DXH to an output end thereof generator 21 shown in FIG. 5 is synthesized with the wide band luminance signal DYX obtained from the wide band luminance signal generator 24 in the signal synthesizer 73 shown in FIG. 3 to produce the luminance signal DY. This luminance signal DY is expressed by the equation: DY=DYX+Lpf(DYL-DYX) and derived from the signal synthesized 73 to the luminance signal output terminal 74.

In such a manner as mentioned above, in the luminance signal DY produced in the embodiment of luminance signal producing circuit according to the present invention shown in FIG. 3, the low frequency component is compensated with the low frequency compensation luminance signal Lpf(DYL-DYX) which comprises one of the signal in which the vertical carrier signal component is cancelled and the signal in which the horizontal carrier signal component is cancelled, which has a smaller absolute value than the other, and therefore adverse effects of folding distortions resulting from the high frequency component are suppressed. Consequently, with the embodiment of luminance signal producing circuit according to the present invention shown in FIG. 3, such a luminance as to contribute to realization of hi-fidelity luminance and improved resolution on pictures reproduced based on the digital color video signal DV in which the luminance signal DY is contained can be obtained.

Figure 6:
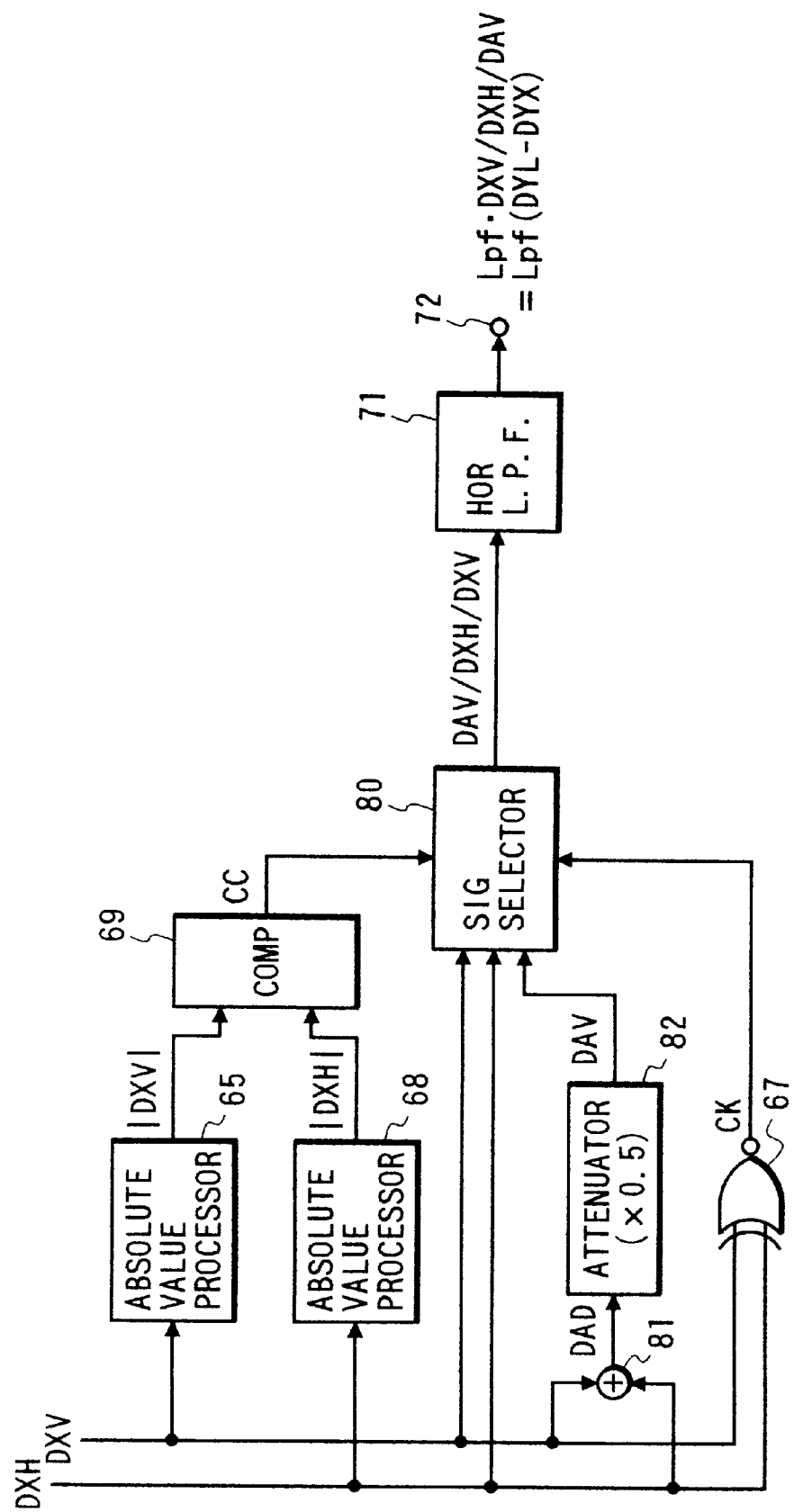
FIG. 6 is a schematic block diagram showing another example a part of the low frequency compensation luminance signal producing portion shown in FIG. 5.

FIG. 6. shows an example of a circuit portion which is able to be replaced for the circuit portion including the AND gate 70 in the low frequency compensation luminance signal generator 21 shown in FIG. 5. In the circuit portion shown in FIG. 6, the synthesized signal DXV supplied to the absolute value processor 65 and the exclusive NOR gate 67 and the synthesized signal DXH supplied to the absolute value processor 68 and the exclusive NOR gate 67 are also supplied to a signal when the discrimination signal CK has the high level and in an OFF state to stop to lead the synthesized signal DXV or DXH to the output end thereof when the discrimination signal CK has the low level.

The synthesized signal DXV or DXH obtained at the output end of the AND gate 70 is supplied to a horizontal low pass filter (horizontal LPF) 71. A low frequency component Lpf·DXV/DXH of the synthesized signal DXV or DXH is derived from the horizontal LPF 71 to an output terminal 72. The low frequency component Lpf·DXV/DXH of the synthesized signal DXV or DXH obtained at the output terminal 72 corresponds to a low frequency component Lpf(DYL-DYX) of the signal DYL-DYX obtained by subtracting the wide band luminance signal DYX from the low frequency luminance signal DYL. This low frequency component Lpf·DXV/DXH of the synthesized signal DXV or DXH, namely, the low frequency component Lpf(DYL-DYX) of the signal DYL-DYX obtained by subtracting the wide band luminance signal DYX from the low frequency luminance signal DYL constitutes a low frequency compensation luminance signal.

Accordingly, the low frequency compensation luminance signal Lpf(DYL-DYX) which is the low frequency component of the smaller one of the synthesized signals DXV and DXH when the synthesized signal DXV and DXH have the same polarity but different levels from each other and is the low frequency component of the synthesized signal DXV when the synthesized signal DXV and DXH have the same polarity and equal levels to each other is obtained at the output terminal 72. On the other hand, the low frequency compensation luminance signal Lpf(DYL-DYX) is not obtained at the output terminal 72 when the synthesized signal DXV and DXH have respective polarities different from each other.

The low frequency compensation luminance signal Lpf(DYL-DYX) thus obtained from the low frequency compensation luminance signal selector 80. The comparison output signal CC from the comparator 69 and the discriminating signal CK from the exclusive NOR gate 67 are further supplied to the signal selector 80.

The circuit portion shown in FIG. 6 is further provided with a signal adder 81 to which the synthesized signals DXV and DXH are supplied and an attenuator 82 operative to reduce the level of an added output signal DAD obtained from the signal adder 81 to half. The signal adder 81 and the attenuator 82 constitute an average signal generator for producing an average signal DAV corresponding to an average to the synthesized signals DXV and DXH and the average signal DAV obtained from the attenuator 82 is supplied to the signal selector 80.

Under a condition wherein the synthesized signals DXV and DXH have the same polarity and thereby the discrimination signal CK from the exclusive NOR gate 67 has the high level, the signal selector 80 is operative to lead the synthesized signals DXV to an output end thereof when the absolute value signal |DXV| is smaller than or equal to the absolute value signal |DXH| and thereby the comparison output signal CC from the comparator 69 has the high level and to lead the synthesized signals DXH to the output end thereof when the absolute value signal |DXV| is larger than the absolute value signal |DXH| and thereby the comparison output signal CC from the comparator 69 has the low level.

On the other hand, under a condition wherein the synthesized signals DXV and DXH have respective polarities different from each other and thereby the discrimination signal CK from the exclusive NOR gate 67 has the low level, the signal selector 80 is operative to lead the average signal DAV obtained from the attenuator 82 to the output end thereof.

Accordingly, in the signal selector 80, one of the synthesized signals DXV and DXH, which has a smaller absolute value than the other, is extracted when the synthesized signal DXV and DXH have the same polarity but different levels from each other and the synthesized signal DXV is extracted when the synthesized signal DXV and DXH have the same polarity and equal levels to each other. Further in the signal selector 80, the average signal DAV corresponding to the average to the synthesized signals DXV and DXH is extracted when the synthesized signal DXV and DXH have respective polarities different from each other.

The synthesized signal DXV, the synthesized signal DXH or the average signal DAV obtained from the signal selector 80 is supplied to the horizontal LPF 71, from which the low frequency compensation luminance signal Lpf(DYL-DYX) comprising the low frequency component Lpf·DXV/DXH/DAV of the synthesized signal DXV, the synthesized signal DXH or the average signal DAV is derived to the output terminal 72.

The low frequency compensation luminance signal Lpf(DYL-DYX) thus obtained functions also in the same manner as the low frequency compensation luminance signal Lpf(DYL-DYX) which is produced by the circuit portion including the AND gate 70 in the low frequency compensation luminance signal generator 21 shown in FIG. 5.

What is claimed is:

1. A luminance signal producing circuit comprising;

signal input means to which an image pickup signal is supplied from a solid-state image sensor which has an image pickup flat portion comprising a matrix of two-dimensionally arrayed rows and columns of picture units and provided thereon with a color filter array comprising a plurality of color filter units arrayed in the manner of a checkered green-line sequential red and blue arrangement to correspond to the picture units, respectively, said image pickup signal comprising red, green and blue signal components obtained respectively from the picture units forming each horizontal reading row in the image pickup flat portion, signal delaying means for delaying the image pickup signal supplied to said signal input means by one line period in stages, wide band luminance signal generating means for producing a wide band luminance signal based on delayed image pickup signals obtained from said signal delaying means, low frequency compensation luminance signal generating means for producing a low frequency compensation luminance signal based on both of the image pickup signal supplied to said signal input means and the delayed image pickup signals obtained from said signal delaying means, and signal synthesizing means for synthesizing the wide band luminance signal and the low frequency compensation luminance signal obtained respectively from said wide band luminance signal generating means and said low frequency compensation luminance signal generating means with each other to produce a luminance signal, wherein said low frequency compensation luminance signal generating means is operative to produce a first signal in which a vertical carrier signal component is cancelled and a second signal in which a horizontal carrier signal component is cancelled based on signals obtained from a vertical low pass filter to which the image pickup signal supplied to said signal input means and the delayed image pickup signals obtained from said signal delaying means are supplied, then operative to extract one of the first and second signals having a smaller absolute value when the first and second signals have the same polarity and none of the first and second signals or a signal corresponding to the average of the first and second signals when the first and second signals have respective polarities different from each other so as to have an extracted signal, and further operative to supply a horizontal low pass filter with the extracted signal to obtain the low frequency compensation luminance signal from said horizontal low pass filter.

2. A luminance signal producing circuit according to claim 1, wherein said low frequency compensation luminance signal generating means comprises absolute value processing means for producing first and second absolute value signals representing absolute values of the first and second signals, respectively, comparing means for comparing the first and second absolute value signals with each other, signal selecting means for extracting one of the first and second absolute value signals having a smaller absolute value than the other in response to a comparison output signal from said comparing means to be supplied to the horizontal low pass filter, polarity discriminating means for discriminating polarities of the first and second signals, and signal stopping means for stopping to supply said horizontal low pass filter with signals extracted by said polarity discriminating means in response to a discrimination signal obtained from said polarity discriminating means.

3. A luminance signal producing circuit according to claim 1, wherein said low frequency compensation luminance signal generating means comprises absolute value processing means for producing first and second absolute value signals representing absolute values of the first and second signals, respectively, comparing means for comparing the first and second absolute value signals with each other, average signal generating means for producing an average signal corresponding to an average to the first and second signals, polarity discriminating means for discriminating polarities of the first and second signals, and signal selecting means for extracting, in response to a comparison output signal from said comparing means, one of the first and second absolute value signals having a smaller absolute value to be supplied to the horizontal low pass filter when the first and second signals have the same polarity and the average signal obtained from said average signal generating means to be supplied to the horizontal low pass filter when the first and second signals have respective polarities different from each other.

4. A luminance signal producing circuit according to claim 1, wherein the wide band luminance signal obtained from said wide band luminance signal generating means is represented by a relation of $0.25 \cdot R + 0.5 \cdot G + 0.25 \cdot B$ provided that red, green and blue primary color signals corresponding to the red, green and blue signals contained in the image pickup signal supplied to said signal input means are represented by R, G and B, respectively.

5. A luminance signal producing circuit according to claim 4, wherein the low frequency compensation luminance signal obtained from said low frequency compensation luminance signal generating means comprises a low frequency component of a difference between a low frequency luminance signal and the wide band luminance signal, and said the low frequency compensation luminance signal is represented by a relation of $0.3 \cdot R + 0.59 \cdot G + 0.11 \cdot B$.

* * * * *